UNITED STATES PATENT OFFICE.

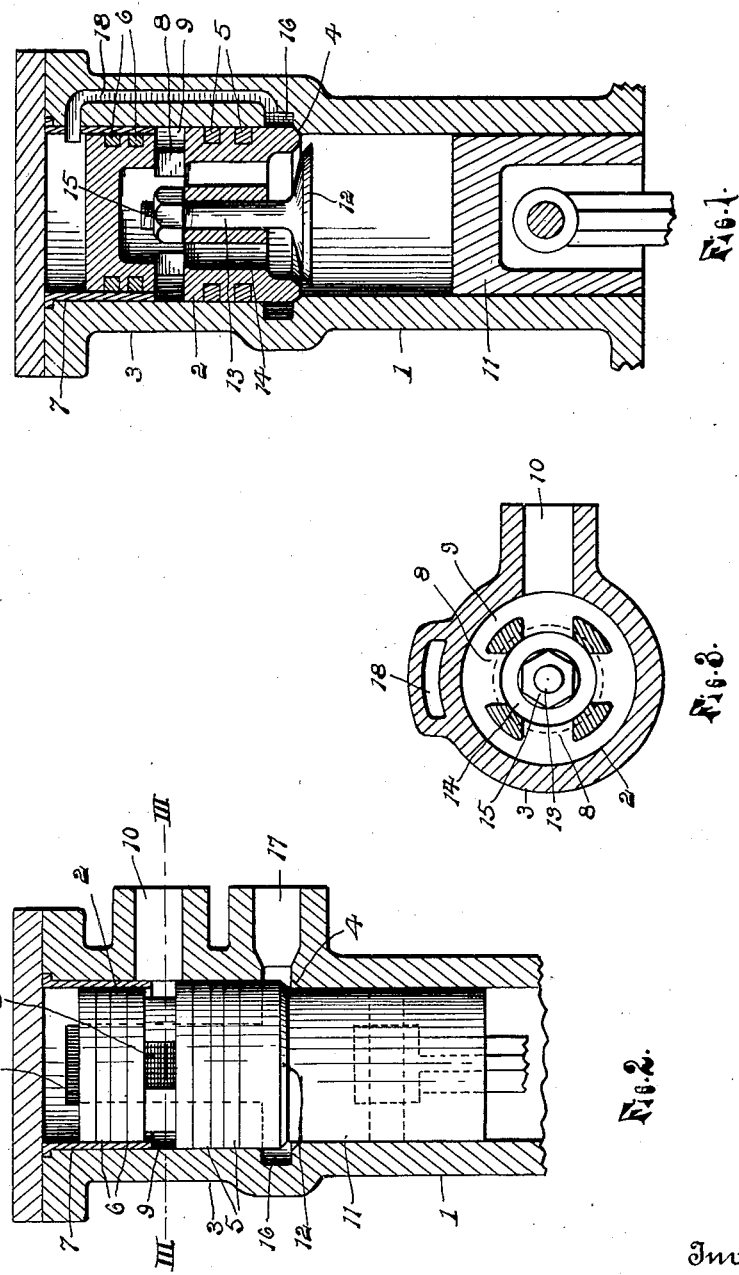

CHARLES B. VAN HORN, OF DETROIT, MICHIGAN.

VALVE FOR FLUID-COMPRESSORS.

1,361,933.

Specification of Letters Patent.   Patented Dec. 14, 1920.

Application filed June 30, 1919.   Serial No. 307,610.

*To all whom it may concern:*

Be it known that I, CHARLES B. VAN HORN, a citizen of the United States of America, residing at Detroit in the county of Wayne and State of Michigan, have invented certain new and useful Improvements in Valves for Fluid-Compressors, of which the following is a specification, reference being had therein to the accompanying drawings.

This invention relates to a valve construction particularly adapted for fluid pumps, compressors and the like, and its object is to provide a construction wherein the suction inlet and pressure exhaust are both controlled by a self-contained member which is completely housed within the pump cylinder, and wherein the pressures thereon are balanced to prevent hammering of the movable parts in seating and unseating, thereby greatly reducing wear and eliminating noise.

A further object is to provide a simple and efficient construction having certain other new and useful features, all as hereinafter more fully described.

With these and other ends in view the invention consists in the matters hereinafter set forth and more particularly pointed out in the appended claims, reference being had to the accompanying drawing, in which—

Figure 1 is a longitudinal vertical section through a cylinder having a piston therein and illustrating the application of a valve construction thereto embodying the invention;

Fig. 2 is a similar section through the cylinder, taken at right angles to the section of Fig. 1 and showing the valve in elevation therein, and Fig. 3 is a transverse section substantially upon the line III—III of Fig. 2.

In compression pumps and the like it has been the usual practice to provide a separate spring controlled valve for both inlet and outlet, these valves being located in the head or other convenient part of the cylinder wall or in the piston, but it has been found that in use these valves soon wear and leak due to the constant hammering of the valves against their seats, caused by the operation of the piston in the cylinder in drawing in and expelling charges under high compression. The usual construction is also unsatisfactory in that the valves must necessarily be of small area, being located in a chamber in the wall or head of the cylinder, and these valves make considerable noise in seating which is usually undesirable, being particularly so where the pumps is used in connection with a small refrigerating plant for house and store use.

The present valve construction is designed particularly for use in connection with pumps embodied in refrigerating plant constructions and comprises a unitary structure adapted to be housed within the upper end of the bore of the cylinder for controlling both inlet and outlet. Further, this valve construction is so designed and arranged that the pressures thereon are balanced, thus eliminating noise and wear due to sudden seating of the parts under high pressures.

In the drawing 1 indicates a pump cylinder of any desired form of construction which is elongated to provide a suitable chamber for a sliding cylindrical piston valve 2, the extended upper end portion 3 of the cylinder being of slightly greater bore than the bore of the cylinder itself to provide a tapered seat 4 for the end of the cylindrical valve 2. This piston valve 2 is provided with packing rings 5 and 6 to provide tight joints between its outer surface and the wall of its cylinder or casing, the upper end portion of said sliding valve 2 being of slightly reduced diameter to fit within a bushing or lining 7 secured within the upper end of the bore of the casing. This cylindrical valve member 2 is chambered or formed hollow from its lower end inwardly and intermediate its ends or just below its reduced upper end portion, are ports or openings 8 communicating with the interior of the valve and with an annular channel 9 in the periphery thereof. This channel 9 is adapted to communicate with an inlet port or passage 10 in the side of the chamber so that upon downward movement of the piston 11 within the cylinder 1, fluid will be drawn in through the passage 10 into the annular groove 9 and thence pass through the openings 8 into the interior of the valve member 2 and thence through the open lower end thereof past the disk valve 12 into the upper end of the cylinder. The disk valve 12 has a stem 13 extending axially of the cylindrical valve 2 through a guide bearing 14 provided therefor in the interior of said cylindrical valve. A nut 15 on the upper end of the stem 13 engages the end of the bearing and limits the movement of the valve 12 which is adapted to seat upon a suitable tapered surface provided therefor on the lower end of the cylindrical valve body 2.

Upon the upward or compression stroke of the piston 11, the valve 12 will at once seat and prevent the fluid from being forced out through the passage through which it entered. This upward movement of the piston 11 on its compression stroke will force the cylindrical valve 2, which carries the disk valve 12, upwardly, unseating it from its seat 4 and opening an annular passage 16 formed in the wall of the valve chamber just above the seat 4. This annular channel 16 is in open communication with an outlet passage 17 and also in open communication with a by-pass 18 formed in the wall of the chamber, which by-pass opens into the upper end of the bore of the chamber above the upper end of the valve structure 2. The fluid which is confined within the cylinder by the disk valve 12 is thus forced into the annular passage 16 and out through the outlet 17, at the same time passing by way of the by-pass 18 into the chamber above the piston valve 2 to balance the pressures thereon and cushion the opening or upward movement of this sliding valve. Hammering of this valve, under the heavy force of fluid under pressure, will thus be prevented and the very high reciprocation of the piston may be maintained due to the elimination of the seating of the valve under high compression and also due to the large area of the exhaust outlet from the cylinder which is provided by the lifting of the valve 2 from its seat 4, which seat is the full diameter of the cylinder.

Upon the downward or suction stroke of the piston, the sliding valve 2 will follow the piston down until it seats at its lower end upon the seat 4 and then the disk valve 12 will at once open and allow free passage of the fluid into the cylinder.

In the construction as shown, the sliding valve 2 is caused to move downwardly to its seat when the piston moves on its suction stroke, without the aid of springs or other yielding means to force the valve downwardly but the use of such means for that purpose is contemplated if found desirable. A very free opening and closing valve mechanism is thus provided and noise and wear caused by the movement of the parts is minimized. Further, very large valve areas are secured through the arrangement of the valve structure within the continuation of the bore of the cylinder and a construction is provided which is not liable to get out of repair and is very efficient in its operation.

Obviously changes may be made in the construction and arrangement of parts within the scope of the appended claims without departing from the spirit of the invention, and I do not, therefore, limit myself to the particular construction or arrangement shown.

What I claim is:—

1. The combination of a cylinder having an extension formed with the bore co-axial with the bore of the cylinder and provided with an inlet and an outlet, the wall of said chamber being formed with a by-pass, a cylindrical valve member in said chamber adapted to close communication between the chamber and cylinder and having a passage therethrough communicating with the inlet, said by-pass opening into the chamber at opposite ends of the valve member, and a valve carried by the valve member for closing the passage therethrough.

2. The combination of a cylinder formed with an extension having a bore co-axial with the cylinder bore and forming a valve chamber, said extension being formed with an annular outlet passage and a valve seat adjacent the end of the cylinder and with an inlet intermediate its ends, said extension being also formed with a by-pass communicating with said annular passage at one end and with the interior of the extension at its opposite end adjacent the opposite end of its bore, a cylindrical valve member slidable in said chamber and adapted to seat upon said seat and formed with a passage therethrough communicating with said inlet at one end and opening through the end of said member adjacent the cylinder, and a disk valve carried by said valve member to close the end of said passage at the seating end of said valve member.

In testimony whereof I affix my signature in the presence of two witnesses.

CHARLES B. VAN HORN.

Witnesses:
ANNA M. DORR,
CHAS. W. STAUFFEGER.